United States Patent [19]

Sugano

[11] Patent Number: 4,561,528
[45] Date of Patent: Dec. 31, 1985

[54] LOCK-UP CLUTCH CONTROL VALVE ASSEMBLY

[75] Inventor: Kazuhiko Sugano, Zama, Japan

[73] Assignee: Nissan Motor Co., Ltd., Yokohama, Japan

[21] Appl. No.: 494,647

[22] Filed: May 16, 1983

[30] Foreign Application Priority Data

May 20, 1982 [JP] Japan .................................. 57-83925

[51] Int. Cl.[4] ........................ F16D 25/00; F16D 33/00
[52] U.S. Cl. .............................. 192/0.052; 192/0.092; 192/3.3; 192/3.31
[58] Field of Search ................. 192/0.052, 0.092, 3.29, 192/3.3, 3.31, 103 F

[56] References Cited

U.S. PATENT DOCUMENTS

| | | | |
|---|---|---|---|
| 3,252,352 | 5/1966 | General .................................. | 74/645 |
| 3,810,531 | 5/1974 | Edmunds ............................. | 192/3.3 |
| 3,857,302 | 12/1974 | Morris .............................. | 192/103 F |
| 3,985,046 | 10/1976 | Morris et al. ......................... | 74/733 |
| 4,046,033 | 9/1977 | Hashimoto et al. .................... | 74/869 |
| 4,095,486 | 6/1978 | Ohnuma .............................. | 74/645 |
| 4,270,636 | 6/1981 | Sunohara et al. .................... | 192/3.31 |
| 4,305,487 | 12/1981 | Sunohara ............................ | 192/3.28 |
| 4,324,156 | 4/1982 | Iwanaga et al. ...................... | 74/869 |
| 4,431,095 | 2/1984 | Suga .................................... | 192/3.29 |
| 4,431,096 | 2/1984 | Kabayashi et al. ................. | 192/3.31 |

FOREIGN PATENT DOCUMENTS

| | | |
|---|---|---|
| 0045492 | 2/1982 | European Pat. Off. |
| 2944811 | 5/1980 | Fed. Rep. of Germany . |
| 2853115 | 6/1980 | Fed. Rep. of Germany . |
| 1447324 | 8/1976 | United Kingdom . |
| 1483032 | 8/1977 | United Kingdom . |
| 2058962 | 4/1981 | United Kingdom . |

Primary Examiner—Rodney H. Bonck
Assistant Examiner—Alan G. Towner
Attorney, Agent, or Firm—Schwartz, Jeffery, Schwaab, Mack, Blumenthal & Evans

[57] ABSTRACT

The control valve assembly comprises a lock-up valve (801) to control engagement of a lock-up clutch (L) and a lock-up timing valve (802) to control the supply of a first fluid pressure to the lock-up valve. The first fluid pressure biases the lock-up valve to effect engagement of the lock-up clutch. The lock-up timing valve is moved to shut off the supply of the bias oil pressure to the lock-up valve when the second signal oil pressure rises above a first predetermined value to allow the lock-up valve to move to a first position thereof to release the engagement of the lock-up clutch. The lock-up valve is moved from the first position thereof to a second position thereof to effect reengagement of the lock-up clutch when the second signal oil pressure increases above a second predetermined value which is higher than the first predetermined value.

6 Claims, 6 Drawing Figures

LOCK-UP CLUTCH CONTROL VALVE ASSEMBLY

BACKGROUND OF THE INVENTION

The present invention relates to lock-up clutch controls and more particularly to control valve assemblies for effecting automatic engagement of the lock-up clutch.

In an automatic transmission having a torque converter with a lock-up clutch, it is desirable to engage the lock-up clutch in each of the high forward speed ratios, such as a second speed ratio upward, for greater operating efficiency of the automatic transmission. However, a great shift shock takes place if a shift is effected with the lock-up clutch kept engaged. In order to eliminate the occurrence of the shifting shock, electronic controls have been proposed which release the engagement of the lock-up clutch temporarily during a shift between two speed ratios in the transmission. However, such electronic controls require expensive hardware including an electronic control unit, sensors and actuators.

SUMMARY OF THE INVENTION

An object of the present invention is to provide an inexpensive and simple lock-up control for a multi-speed automatic transmission having a lock-up clutch which requires less installation space.

The present invention provides a control comprising a lock-up valve movable to first and second positions for controlling the disengagement and engagement of the lock-up clutch, and a lock-up timing valve movable to shut off supply of a first fluid pressure to the lock-up valve. The first fluid pressure biases the lock-up valve to the second position so as to engage the lock-up clutch. Both the lock-up valve and lock-up timing valve are movable in response to a second fluid pressure. The lock-up timing valve is moved to the position to shut off the supply of the first fluid pressure when the second fluid pressure increases above a first predetermined value, allowing the lock-up valve to move to the first position thereof so as to release the engagement of the lock-up clutch. The lock-up valve is moved back from the first position thereof to the second position thereof to effect reengagement of the lock-up clutch when the second signal oil pressure increases above a second predetermined value which is higher than the first predetermined value.

A preferred form of the control is adapted to maintain the lock-up clutch in a disengaged condition in the lowest or first speed ratio in the transmission to provide increased torque delivery through the transmission in this speed ratio. For this purpose, a source of the bias signal oil pressure is an oil chamber in the transmission which is kept pressurized when each of the forward speed ratios except the first speed ratio is established in the transmission.

Preferably, the control is adapted to maintain the lock-up clutch in the disengaged condition for a longer time at a wider throttle opening degree. For accomplishing this function, a spool of the lock-up valve has a pressure acting area which is always subject to the throttle related pressure. As used herein, the term "throttle related pressure" refers to a throttle pressure, a throttle modulator pressure and a line pressure which are variable as the throttle opening varies.

Preferably, the control is adapted to maintain the lock-up clutch in a disengaged condition at low engine revolution speeds to prevent the occurrence of vibration which otherwise would take place with the lock-up clutch maintained in the engaged condition at low engine revolution speeds. For this purpose, a first speed cut valve shuts off the supply of the second fluid pressure to the lock-up valve and lock-up timing valve when a governor pressure is lower than a predetermined value, and a second speed cut valve shuts off the supply of first fluid pressure to the lock-up timing valve when the total of the governor pressure and a third fluid pressure is lower than a predetermined value.

DETAILED DESCRIPTION OF THE INVENTION

Figure 1:
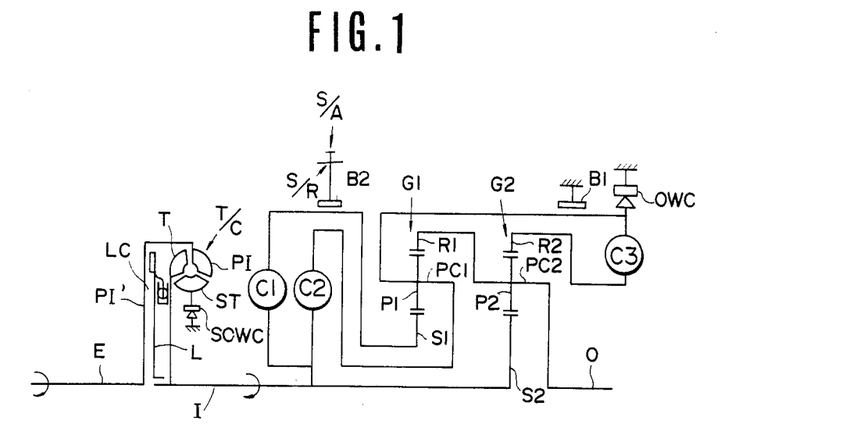
FIG. 1 is a schematic view of a power train of a four-speed automatic transmission.

Referring to FIG. 1, the power train of a four-speed automatic transmission having four forward speed ratios including an overdrive is described. The power transmission mechanism comprises an input shaft I to which rotary power is delivered from an engine output shaft E via a torque converter T/C; an output shaft O which transmits driving power to a final drive; a first planetary gear set G1; a second planetary gear set G2; a first clutch C1; a second clutch C2; a third clutch C3; a first brake B1; a second brake B2; and a one-way clutch OWC. The first planetary gear set G1 comprises a sun gear S1, an internal gear R1, a carrier PC1 carrying pinion gears P1 meshing simultaneously both the gears S1 and R1, while the planetary gear set G2 comprises a sun gear S2, an internal gear R2 and a carrier PC2 carrying pinion gears P2 meshing simultaneously both gears S2 and R2. The carrier PC1 is connectable via the clutch C1 with the input shaft I, and the sun gear S1 is connectable via the clutch C1 with the input shaft I. The carrier PC1 is connectable also via the clutch C3 with the internal gear R2. The sun gear S2 is constantly connected with the input shaft I, and the internal gear R1 and carrier PC2 are constantly connected with the output shaft O. The brake B1 is adapted to anchor the sun gear S1. The brake B2 is a band brake which is actuated in response to oil pressure applied to a servo apply chamber S/A thereof and a servo release chamber S/R thereof having a larger pressure acting area. That is, when oil pressure is supplied to the servo apply chamber S/A, the brake B2 is applied, and when oil pressure is supplied to the servo release chamber S/R, the brake B2 is released irrespective of whether oil pressure is supplied to the servo apply chamber S/A or not. The one-way clutch OWC is so constructed that it allows forward rotation (i.e., the same rotation as that of the engine output shaft E), but prevents reverse rotation (i.e., the rotation opposite to the forward rotation), that is, it acts as a brake only during reverse rotation. The torque converter T/C comprises a pump impeller PI, a turbine runner T, a stator ST and a lock-up clutch L.

The pump impeller PI is connected via a torque converter cover PI' with the engine output shaft E. The turbine runner T is connected with the input shaft I, and the stator ST is connected via a one-way clutch SOWC with a stationary part. The lock-up clutch L connected with the turbine runner T is axially movable and cooperates with the torque converter cover PI' integral with the pump impeller PI to form a lock-up clutch oil chamber LC therebetween and it is pressed against the torque converter cover PI' to rotate integrally with same when oil pressure within the lock-up clutch oil chamber LC becomes lower than that within the torque converter T/C. The detail construction of the lock-up clutch L may be found in U.S. Pat. No. 4,305,487 issued Dec. 15, 1981.

The cluthes C1, C2 and C3, and brake B1, one-way clutch OWC and brake B2 are engageable in the predetermined combinations shown by the following Table to provide the four forward speed ratios and one reverse speed ratio.

| | C1 | C2 | C3 | B1 (OWC) | B2 S/A | S/R | Gear Ratio | $\alpha 1 = 0.45$ $\alpha 2 = 0.45$ |
|---|---|---|---|---|---|---|---|---|
| 1st speed | o | | | o | | | $\dfrac{1 + \alpha 2}{\alpha 2}$ | 3.22 |
| 2nd speed | o | | | | o | | $\dfrac{\alpha 1 + \alpha 2}{\alpha 2(1 + \alpha 1)}$ | 1.38 |
| 3rd speed | o | o | | | o | o | 1 | 1 |
| 4th speed | | o | | | o | o | $\dfrac{1}{1 + \alpha 1}$ | 0.69 |
| Reverse | o | | o | | | | $-\dfrac{1}{\alpha 1}$ | −2.22 |

In the Table, the sign "o" indicates for each of clutches and brakes, the clutch or brake in question is engaged or applied. The characters $\alpha 1$ and $\alpha 2$ denote a ratio of number of teeth of the internal gear R1 to the number of teeth of the corresponding sun gear S1 and a ratio of the number of teeth of the internal gear R2 to the number of teeth of the corresponding sun gear S2, respectively. Gear ratio is a ratio of the number of rotation of the input shaft I to that of the output shaft O. What is denoted by a label (OWC) below the brake B1 means that the first speed ratio is produced owing to the engagement of the one-way clutch OWC even if the brake B1 is not applied. However, in this first speed ratio, it is not possible for the output shaft O to drive the engine via the power train (that is, no engine braking is provided). What is indicated by the sign "o" in the column below B2 indicates that the servo apply chamber S/A and/or the servo release chamber S/R in question are supplied with oil pressure.

Figure 2A:
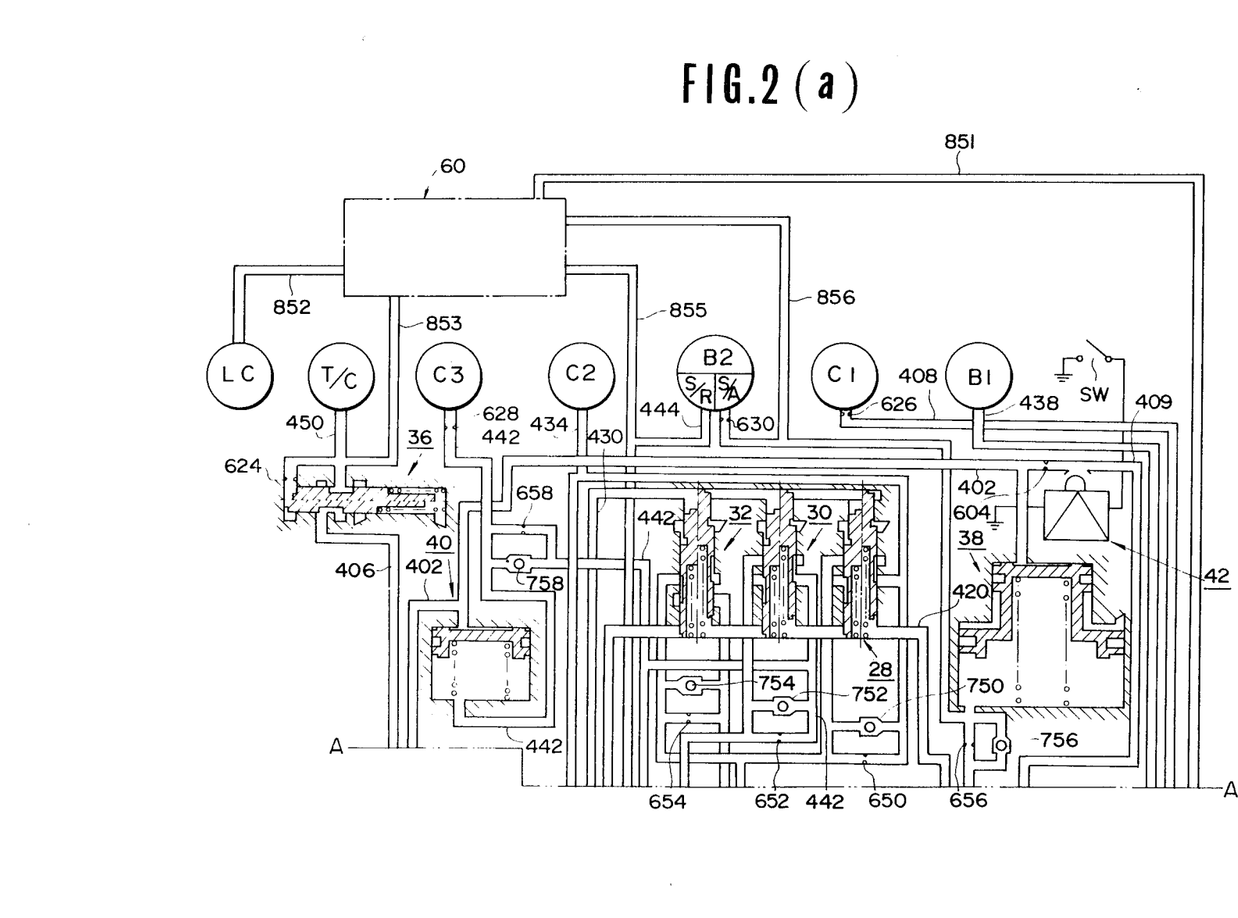
FIGS. 2(a), 2(b) and 2(c) when combined are a circuit diagram of a hydraulic pressure control system of the automatic transmission coupled to a lock-up control according to the present invention.
Figure 2B:
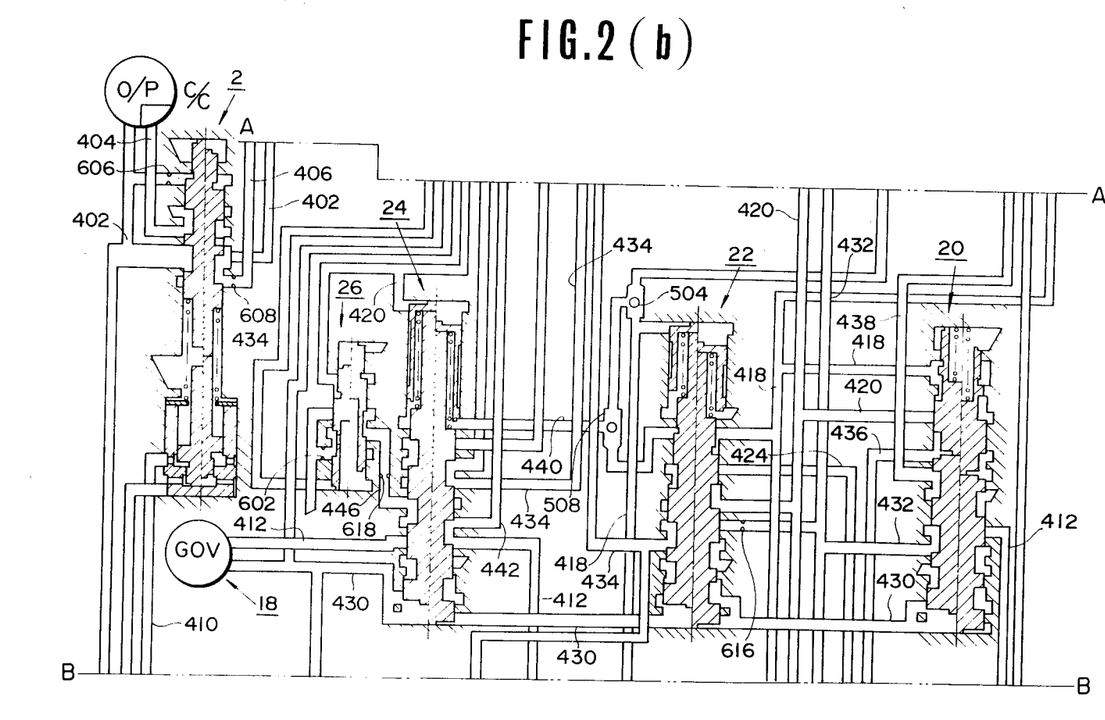
Figure 2C:
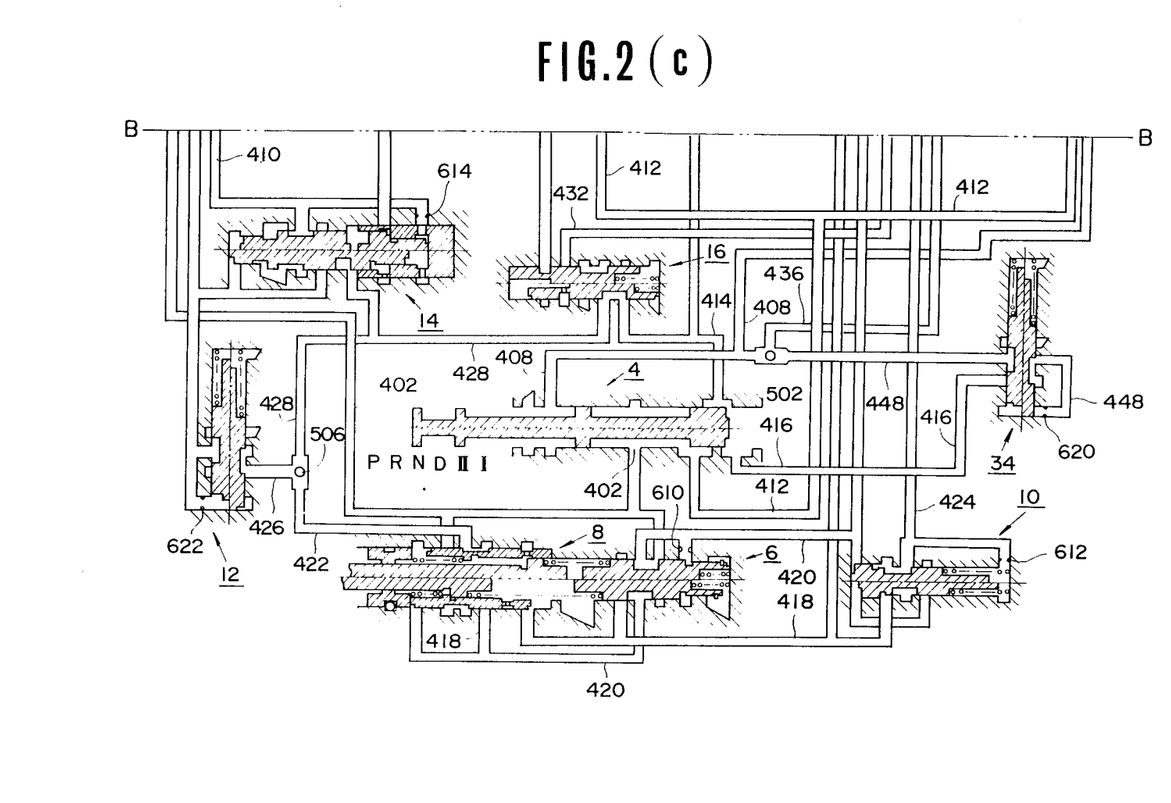

Referring to FIGS. 2(a), 2(b) and 2(c), a hydraulic pressure control system for the four-speed automatic transmission is briefly described.

In FIGS. 2(a), 2(b) and 2(c), the lock-up clutch oil chamber LC, the torque converter T/C, the clutchs C1, C2, C3, the brakes B1 and B2 and servo apply chamber S/A and servo release chamber S/R are diagrammatically illustrated. The hydraulic control system comprises an oil pump O/P, an overdrive inhibitor switch SW, a line pressure regulator valve 2, a manual selector valve 4, a throttle valve 6, a throttle failsafe valve 8, a throttle modulator valve 10, a pressure modifier valve 12, a cutback valve 14, a line pressure booster valve 16, a governor valve 18, a 1-2 shift valve 20, a 2-3 shift valve 22, a 3-4 shift valve 24, a 2-4 timing valve 26, a 2-3-timing valve 28, a 3-4 timing valve 30, a 3-2 timing valve 32, a first range pressure reducing valve 34, a torque converter pressure reducing valve 36, a pressure accumulator 38, a 4-3 -accumulator 40, and an overdrive inhibitor solenoid 42. The numerals 402, 404, 406, 408, 409, 410, 411, 412, 414, 416, 418, 420, 422, 424, 426, 428, 430, 432, 434, 436, 438, 440, 442, 444, 446, 448, and 450 denote oil conduits, the numerals 502, 504, 506 and 508 shuttle valves, and the numerals 602, 604, 606, 608, 610, 612, 614, 616, 618, 620, 622, 624, 626, 628, 630, 650, 652, 654, 656, and 658 orifices, and the numerals 750, 752, 754, 756 and 758 check valves.

Turning to the Table, the servo apply chamber S/A is kept pressurized within each of the four forward speed ratios except the lowest or first speed ratio and the servo release chamber S/R is pressurized within an intermediate speed ratio, i.e., the third speed ratio, between the highest or fourth speed ratio and the lowest or first speed ratio. It may be noted that the oil pressure supplied to servo apply chamber S/A via the oil conduit 432 from the 1-2 shift valve 20 is employed by a lock-up control valve assembly 60 as a first fluid pressure signal. The control valve assembly 60 employs the oil pressure supplied to the servo release chamber S/R via the oil conduit 444 as a second fluid pressure signal. These first and second fluid pressure signals are conveyed by oil conduit 856 branching off the oil conduit 432 and an oil conduit 855 branching off the oil conduit 444, respectively.

Figure 3:
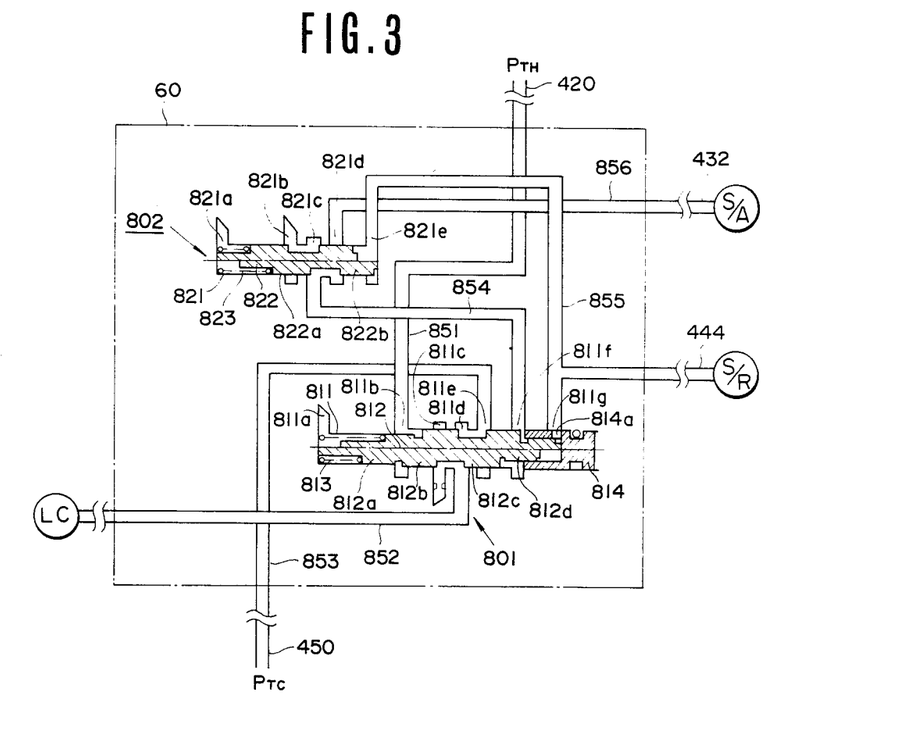
FIG. 3 is diagrammatic view of the lock-up control illustrated in a black box in FIG. 2(a)

Referring to FIG. 3, the control valve assembly 60 is described. The control valve assembly 60 comprises a lock-up valve 801 and a lock-up timing valve 802. The lock-up valve 801 comprises a spool 812 slidably disposed in a valve bore 811, a spring 813 biasing the spool 812 from one end of the valve bore 811, and an end plug 814 closing the other end of the valve bore 811. The valve bore 811 has a plurality of ports 811a, 811b, 811c, 811d, 811e, 811f and 811g. The ports 811a and 811c are drain ports. The port 811b is supplied with a throttle pressure $P_{TH}$ via an oil conduit 851 branching off the oil conduit 420 wherein a fluid pressure proportional to the throttle opening degree is produced by the throttle valve 6. The port 811d is connected with the lock-up clutch chamber LC via an oil conduit 852. The port 811e is supplied with a torque converter supply pressure $P_{TC}$ via an oil conduit 853 branching off the torque converter supply oil conduit 450. Since when the lock-up oil chamber LC is supplied with this pressure $P_{TC}$, the lock-up clutch L is disengaged, this pressure may be referred to by the term "a lock-up release signal." The port 811 is connected via an oil conduit 854 with a port 821c of the lock-up timing valve 802. The port 811g is connected via an oil conduit 855 with a port 821e of the lock-up timing valve and also with the servo release chamber S/R. The spool 812 has lands 812a, 812b, 812c and 812d (the lands 812b and 812c are same diametrical lands, the lands 812a and 812d are smaller in diameter than the diameter of each of the lands 812b and 812c). Oil pressure in the port 811b acts on a differential area between the lands 812a and 812b. Depending upon the position of the spool 812, the lands 812b and 812c permit the port 811d to communicate with the port 811c or the port 811e. Oil pressure in the port 811f acts on a differential area between the lands 812c and 812d. Oil pressure in the port 811g acts via a port 814a of the plug 814 on the end face of the land 812d fitting in a bore formed in the plug 814.

The lock-up timing valve 802 comprises a spool 822 slidably disposed in a valve bore 821, and a spring 823 biasing the spool 822 to the right, as viewed in FIG. 3. The valve bore 821 has ports 821a, 821b, 821c, 821d and 821e. The ports 821a and 821b are drain ports, the port 821c is connected with the before mentioned oil conduit 854, the port 821d is connected via an oil conduit 856 with the servo apply chamber S/A, and the port 821e is connected with the before mentioned oil conduit 855. The spool 822 has the same diameter lands 822a and 822b and the lands 822a and 822b permit the port 821c to communicate with the port 821b or the port 821d depending upon the position of the spool 822. Oil pressure in the port 821e acts on the righthand end, as viewed in FIG. 3, of the land 822b.

The operation is described below.

To effect a shift from the first speed ratio to the second speed ratio, the 1-2 shift valve 20 shown in FIG. 2(b) upshifts from a position illustrated by the right half thereof to a position illustrated by the left half thereof, communicating the oil conduit 412 with the oil conduit 432, thus supplying oil pressure to the servo apply chamber S/A. This oil pressure is delivered through the oil conduit 856 to the port 821d of the lock-up timing valve 802. Because, under this condition when no oil pressure acts on the end of the land 822b via the port 821e, the spool 822 of the lock-up timing valve is in a first position illustrated by the lower half thereof, the port 821d is allowed to communicate with the port 821c. Thus, the oil pressure in the oil conduit 856 enters into the oil conduit 854 and reaches the port 811f of the lock-up valve 801. The oil pressure in the port 811f acts on the differential area between the lands 812c and 812d, biasing the spool 812 to the left, as viewed in FIG. 3, overcoming the spring 813, to a position illustrated by the lower half thereof. Upon assuming the lower half position, the oil pressure within the lock-up oil chamber LC is discharged past the oil conduit 852 and port 811d via the drain port 811c. As a result, the lock-up clutch L is engaged.

When, in this situation, the vehicle increases its speed and the governor pressure $P_G$ increases correspondingly, the 2-3 shift valve 22 shown in FIG. 2(b) shifts from a position illustrated by the right half thereof, as viewed in FIG. 2(b), to a position illustrated by the left half thereof, as viewed in FIG. 2(b), so as to communicate the oil conduit 432 with the oil conduit 434, supplying oil pressure to the servo release chamber S/R. Thus, the oil pressure within the servo release chamber 444 starts to increase. This oil pressure is delivered via the oil conduit 855 to the port 811g of the lock-up valve 801 and also to the port 821e of the lock-up timing valve 802. The spring 823 of the lock-up timing valve 802 is chosen such that it is deformed with a lesser force than the force with which the spring 813 of the lock-up valve 801 starts to be deformed. Thus, the lock-up timing 802 moves from the position illustrated by the lower half thereof as viewed in FIG. 3 to the position illustrated by the upper half thereof as viewed in FIG. 3 at a stage wherein the oil pressure supplied to the servo release chamber S/R is still low. This causes the oil conduit 854 which has ben supplied with oil pressure from the oil conduit 856 to communicate with the drain port. Thus the bias oil pressure acting on the differential area between the lands 812c and 812d is exhausted and disappears, allowing the spring 813 to push back the spool 812 to the position illustrated by the upper half thereof, communicating the oil conduit 852 with the oil conduit 852. This results in supplying the torque converter pressure $P_{TC}$ to the lock-up clutch chamber LC to disengage the lock-up clutch L. As the shifting operation from the second speed ratio to the third speed ratio progresses and the oil pressure within the servo release chamber S/R increases further, the oil pressure increases to a value high enough to press the spool 812 to the left as viewed in FIG. 3 overcoming the spring 813. As a result, the lock-up valve 801 is moved back from the position illustrated by the upper half thereof to the position illustrated by the lower half thereof as viewed in FIG. 3, communicating the oil conduit 852 with the drain port 811c again, discharging the oil from the lock-up clutch oil chamber LC, thus engaging the lock-up clutch L. The setting is such as to ensure that the reengagement of the lock-up clutch L takes place after the oil pressure within the servo release chamber S/R has increased to a value high enough to establish the third speed ratio, i.e., after the completion of the shift from the second speed ratio to the third speed ratio. In the above manner, the engagement of the lock-up clutch L is released temporarily during a short period of time during a shift from the second speed ratio to the third speed ratio.

When the governor pressure $P_G$ increases further to a value high enough to shift the 3-4 shift valve 24 shown in FIG. 2(b) from a position illustrated by the right half thereof to a position illustrated by the left half thereof as viewed in FIG. 2(b), the oil pressure within the servo release chamber S/R begins to be exhausted. When the oil pressure within the servo release chamber S/R drops slightly, the lock-up valve 801 is moved from the position illustrated by the lower half thereof as viewed in FIG. 3 to the position illustrated by the upper half thereof as viewed in FIG. 3 owing to the action of the spring 813, supplying the torque converter supply pressure $P_{TC}$ to the lock-up clutch oil chamber LC, thus releasing the engagement of the lock-up clutch L. When the oil pressure within the servo release chamber S/R drops further, the lock-up timing valve 802 is moved from the position illustrated by the upper half thereof as viewed in FIG. 3 to the position illustrated by the lower half thereof as viewed in FIG. 3 by the action of the spring 823, communicating the oil pressure within the servo apply chamber S/A to the oil conduit 854 so as to act on the end of the lock-up valve 801, thus moving the lock-up valve 801 back to the position illustrated by the lower half thereof against the spring 813. As a result, the lock-up clutch L is engaged again. When the oil pressure within the servo release chamber S/R drops to a value low enough to allow the movement of the lock-up timing valve 802 to the position illustrated by the lower half thereof, the shift from the third speed ratio to the fourth speed ratio is completed. In the above manner, the engagement of the lock-up clutch L is released temporarily during a short period of time upon effecting a shift from the third speed ratio to the fourth speed ratio.

In a similar manner, the engagement of the lock-up clutch L is released temporarily during a shift from the fourth speed ratio to the third speed ratio and during a shift from the third speed ratio to the second speed ratio.

From the above description it will be understood that in the embodiment illustrated in FIG. 3, although the lock-up clutch L is maintained in engaged condition in the second, third and fourth speed ratios, the energy of the shifting shock is absorbed by the fluid connection between the pump impeller PI and the turbine runner T which is temporarily established by releasing the engagement of the lock-up clutch LC during a shift between two of the second, third and fourth speed ratios.

It will be understood that a period of time between which the lock-up clutch is disengaged during the shifting operation corresponds to a difference between a timing at which the lock-up timing changes its position and a timing at which the lock-up valve 801 changes its position. This difference is desirably varied in response to the throttle opening degree of the engine because the time required for shifting operation increases as the throttle opening degree increases. For this purpose, the throttle pressure is introduced to the port 811b of the lock-up valve 801. With the introduction of the throttle pressure, the more the throttle pressure increases, the more the oil pressure in the port 811g at which the lock-up valve 801 change its position increases. That is, the higher the throttle pressure, the higher the oil pressure in the servo release chamber S/R needed for shifting the lock-up valve 801. Therefore, as the throttle pressure rises, the timing at which the lock-up valve switches is delayed correspondingly, thus elongating the period of time when the lock-up clutch L is released during a shift between two speed ratios. Thus reengagement of the lock-up clutch is prevented prior to the completion of the shifting operation with wide throttle opening degree settings.

Although the control valve assembly 60 has been explained as coupled to the hydraulic control system which provides four speed ratios, it may be coupled to a hydraulic control system as found in U.S. Pat. No. 4,324,156 issued Apr. 13, 1982 wherein in FIG. 2A the counterparts to the servo apply chamber, servo release chamber, and the throttle pressure conveying conduit are denoted by the reference numerals 76, 76' and 382, respectively.

Figure 4:
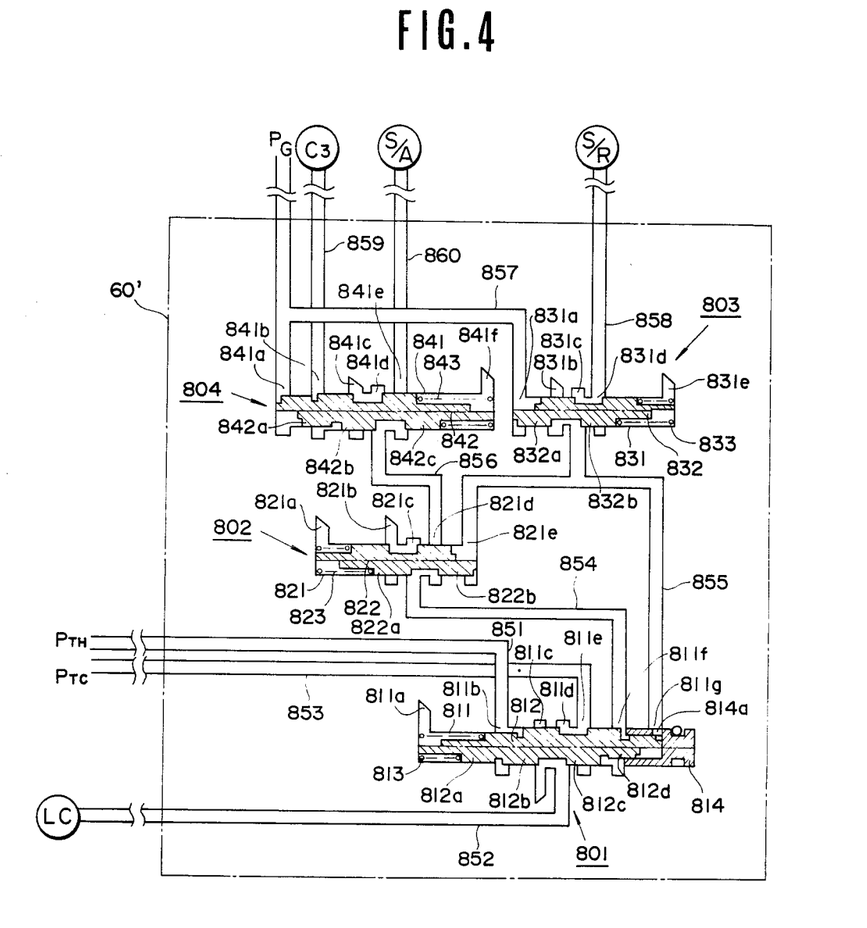
FIG. 4 is a diagrammatic view of a second embodiment of a lock-up control according to the present invention.

Referring to FIG. 4, a second embodiment of a control valve assembly which is now denoted by the reference numeral 60' is described below.

This embodiment is different from the first embodiment in the provision of a first speed cut valve 803 and a second speed cut valve 804. The first and second speed cut valves 803 and 804 are provided to prevent the engagement of the lock-up clutch L in operating ranges at low engine revolution speeds.

The first speed cut valve 803 comprises a spool 832 slidably disposed in a valve bore 831 and a spring 833 biasing the spool 832 to the left as viewed in FIG. 4. The valve bore 831 has ports 831a, 831b, 831c, 831d and 831e. The ports 831b and 831e are drain ports, the port 831a is supplied with a governor pressure $P_G$ from an oil conduit 857, the port 831c is connected with an oil conduit 855, and the port 831d is connected via an oil conduit 858 with a servo release chamber S/R. The spool 832 has lands 832a and 832b of the same diameter, and the lands 832a and 832b allow the port 831c to communicate with the port 831b or the port 831d depending upon the position of the spool 832. Oil pressure in the port 831a acts on the left end, as viewed in FIG. 4, of the land 832a.

The second speed cut valve 804 comprises a spool 842 slidably disposed in a valve bore 841 and a spring 843 biasing the spool 842 to the left as viewed in FIG. 4. The valve bore 841 has ports 841a, 841b, 841c, 841d, 841e, and 841f. The ports 841c and 841f are drain ports, the port 841a is connected with the oil conduit 857, the port 841b is connected via an oil conduit 859 with the above mentioned clutch C3, the port 841d is connected with an oil conduit 856, and the port 841e is connected via an oil conduit 860 with the servo apply chamber S/A. The spool 842 has lands 842b and 842c of the same diameter, and a reduced diameter land 842l. The lands 842a and 842c allow the port 841d to communicate with the port 841c or the port 841e depending upon the position of the spool 842. Oil pressure in the port 841a acts on the left end, as viewed in FIG. 4, of the land 842a, and oil pressure in the port 841a acts on a differential area between the lands 842a and 842b.

The operation of this embodiment is as follows.

During operation with the first or second speed ratio, the spool 842 of the second speed cut valve 804 is subjected to a rightwardly directed force resulting from the governor pressure acting on the land 842a and another rightwardly directed force resulting from the oil pressure in the clutch C3 acting on the differential area between the lands 842a and 842b, and as long as the total of these rightwardly directed forces is less than the force of the spring 843, the second speed cut valve 804 stays in a position illustrated by the upper half thereof as viewed in FIG. 4 wherein the oil pressure from the servo apply chamber S/A is blocked by the land 842c. Then, since no pressure builds up in the oil conduit 854 irrespective of the state of the lock-up timing valve 802, the lock-up clutch L will not be engaged. However, when the total of the rightwardly directed forces gets larger than the force of the spring 843, the oil conduit 860 is allowed to communicate with the oil conduit 856 (this state is the same as the hydraulic pressure circuit shown in FIG. 3), rendering the lock-up valve 801 and lock-up timing valve 802 to operate as they do in the case of FIG. 3. If the force of th spring 843 is properly set, the engagement of the lock-up clutch L is prevented even if the transmission shifts into the second speed ratio as long as the vehicle speed remains lower than a predetermined value. Since the before mentioned forces result from adding the force by the governor pressure $P_G$ and the force resulting from the line pressure which is supplied, as an actuating pressure, to the clutch C3, if the line pressure increases (i.e., if the throttle opening degree increases), the total of the rightwardly directed forces reach the predetermined value while governor pressure $P_G$ is still low, whereas if the line pressure decreases (i.e., if the throttle opening degree decreases), the total of the directed forces does not reach the predetermined value until the governor pressure is at a higher value. This means that if the throttle opening degree is small, even if the governor pressure $P_G$ becomes excessively high, the total of the rightwardly directed forces can not overcome the force of the spring 843 because the line pressure is low, thus leaving the lock-up clutch L in a disengaged condition even after the transmission has shifted into the second speed ratio.

The first speed cut valve 803 serves the function of preventing the engagement of the lock-up clutch L as long as the vehicle speed is lower than a predetermined value. That is, when the governor pressure $P_G$ acting in the port 831a is low, the first speed cut valve 803 is in a position illustrated by the lower half thereof wherein the oil pressure from the servo release chamber S/R is blocked off by the land 832b. When the governor pressure $P_G$ becomes higher than a predetermined value, the first speed cut valve 803 is moved to a position illustrated by the upper half as viewed in FIG. 4. In this state, the oil conduit 858 is allowed to communicate with an oil conduit 855 (the same state as the hydraulic pressure circuit as shown in FIG. 3), and the lock-up valve 801 and lock-up timing valve operate in the similar manner as described before. Thus, as long as the vehicle speed is lower than the predetermined value, the engagement of the lock-up clutch L is prevented even if the transmission shifts into the third speed ratio. The predetermined vehicle speed value at which the first speed cut valve 803 changes its position is set higher than a shift vehicle speed value at which the transmission shifts from the second speed ratio to the third speed ratio at small throttle opening degrees, and this means that during operation with the small throttle opening degrees, the engagement of the lock-up clutch L is allowed only after the vehicle speed has increased the above predetermined vehicle speed value after the transmission shifted into the third speed ratio.

The lock-up clutch L is not engaged even if the transmission has shifted to the fourth speed ratio as long as the vehicle speed is lower than a predetermined vehicle speed. Since during operation in the fourth speed ratio the oil pressure in the clutch $C_3$ is discharged and the force acting on the second speed cut valve 804 rightwardly is the force by the governor pressure $P_G$ alone, the second speed cut valve 804 does not change its position from the position illustrated by the upper half thereof to the position illustrated by the lower half thereof until the governor pressure $P_G$ rises excessively. In this situation, the vehicle speed at which the second speed cut valve 804 is moved from the position illustrated by the upper half thereof to the position illustrated by the lower half thereof is set higher than a shift vehicle speed at which the transmission shifts from the second speed ratio to the third speed ratio. When the second speed cut valve 804 is in the position illustrated by the upper half thereof, since the oil pressure from the servo apply chamber S/A is blocked by the land 842c and thus does not reach the oil conduit 856, the lock-up clutch L is disengaged. Therefore, even if the transmission shifts into the fourth speed ratio, the engagement of the lock-up clutch L is prevented at vehicle speeds lower than the predetermined vehicle speed as long as the throttle opening degree is small.

In this manner described above, the engagement of the lock-up clutch L is prevented at low vehicle speed range with a second, third or fourth speed ratio, leaving the pump impeller of the torque converter T/C in fluidic connection with the turbine runner T thereof, thus preventing the occurrence of unpleasant vibration of the engine which otherwise would take place at low vehicle speeds.

In the above described control valve assemblies, the throttle pressure is employed as a fluid pressure signal and is introduced into the oil conduit 851, the same effect is obtained even if a throttle modulator pressure which is provided by the throttle modulator valve 10 shown in FIG. 2(a) or a line pressure provided by the line pressure regulator valve 2 shown in FIG. 2(b) is used instead of the throttle pressure. Thus, the term "throttle related pressure" is used to refer to the throttle pressure, throttle modulator pressure and the line pressure. A more precise description as to the character of the throttle pressure, throttle modulator pressure and line pressure may be found in U.S. Pat. No. 4,324,156 especially the description in connection with FIG. 3 of this patent. In this U.S. patent the term "modulated throttle pressure" corresponds to the term "modulator throttle pressure" used in the present application.

It will now be appreciated that the present invention provides a lock-up control valve assembly which maintains the lock-up clutch in the engaged condition in each of the plurality of forward speed ratios except the lowest speed ratio because the engagement of the lock-up clutch is released temporarily during a shift between two speed ratios, thus enhancing the operating efficiency of the automatic transmission. In the case of the embodiment described in connection with FIG. 4, since the engagement of the lock-up clutch at low speeds in each of the speed ratios, the occurrence of unpleasant vibration derived from the engine operation at low speeds is prevented.

I claim:

1. A control for a lock-up clutch for an engine driven automatic transmission having a plurality of forward speed ratios including a lowest speed ratio and a highest speed ratio, comprising:

first fluid pressure providing means for providing a first fluid pressure when each of the plurality of speed ratios except the lowest speed ratio is established in the transmission;

second fluid pressure providing means for providing a second fluid pressure when a predetermined speed ratio between the highest and lowest speed ratios is established in the transmission;

a lock-up control valve operatively connected with the lock-up clutch and being movable to first and second positions for controlling the disengagement and engagement respectively of the lock-up clutch, said lock-up valve including a first pressure acting area adapted to communicate with said first fluid pressure providing means, and a second pressure acting area in fluid communication with said second fluid pressure providing means to be biased toward said second position thereof;

a lock-up timing valve operatively connected between said first fluid pressure providing means and said lock-up valve and being movable to a first position for communicating said first fluid pressure to said first pressure acting area to bias said lock-up valve means toward said second position thereof and to a second position to exhaust the bias pressure acting on said first pressure acting area, said lock-up timing valve means including a pressure acting area in fluid communication with said second fluid pressure providing means and being biased by said second fluid pressure toward said second position thereof;

first resistive means for resisting a movement of said lock-up timing toward said second position thereof until said second fluid pressure increases above a first predetermined value; and second resistive means for resisting a movement of said lock-up valve toward said second position thereof until said second fluid pressure increases above a second predetermined value, said second predetermined value being higher than said first predetermined value.

2. A control as claimed in claim 1, wherein said second resistive means includes a spring biasing said lock-up valve toward said first position thereof and means for supplying a throttle related pressure to said lock-up valve so as to bias said lock-up valve toward said first position thereof.

3. A control as claimed in claim 2, wherein said first resistive means includes a spring biasing said lock-up timing valve toward said first position thereof.

4. A control as claimed in claim 1, further comprising:
governor means for providing a governor fluid pressure;
a first speed cut valve operatively connected between said first fluid pressure means and said lock-up timing valve and being movable to a first position for shutting off communication of said first signal fluid pressure to said lock-up timing valve and a second position for communicating said first signal fluid pressure to said lock-up timing valve, said first speed cut valve having a pressure acting area in fluid communication with said governor fluid pressure to be biased toward said second position thereof; and
a second speed cut valve operatively connected between said first fluid pressure providing means and said lock-up timing valve and being movable to a first position for shutting off communication of said first signal fluid pressure with said lock-up timing valve and a second position for communicating said first fluid pressure to said lock-up timing valve, said second speed cut valve including a pressure acting area in fluid communication with said governor means to be biased toward said second position thereof.

5. A control as claimed in claim 4, further comprising third fluid pressure providing means for providing a third fluid pressure when the highest speed ratio is established in the transmission, and wherein said second speed cut valve includes a second pressure acting area in fluid communication with said third signal fluid pressure to be biased toward said second position thereof.

6. A control as claimed in claim 5, further comprising a spring which resists a movement of said speed cut valve toward said second position thereof until said governor fluid pressure increases above a third predetermined value, and a spring which resists a movement of said second speed cut valve toward said second position thereof until the total bias force derived from said governor fluid pressure and said third fluid pressure increases above a fourth predetermined value.

* * * * *